May 12, 1970     G. C. WEBB     3,511,297

APPARATUS FOR DEHYDRATION OF ORGANIC LIQUIDS-SOLIDS COMPOSITES

Filed June 5, 1968     4 Sheets-Sheet 1

INVENTOR.
GEORGE C. WEBB
BY
Bean & Bean
ATTORNEYS

May 12, 1970 G. C. WEBB 3,511,297
APPARATUS FOR DEHYDRATION OF ORGANIC LIQUIDS-SOLIDS COMPOSITES
Filed June 5, 1968 4 Sheets-Sheet 2
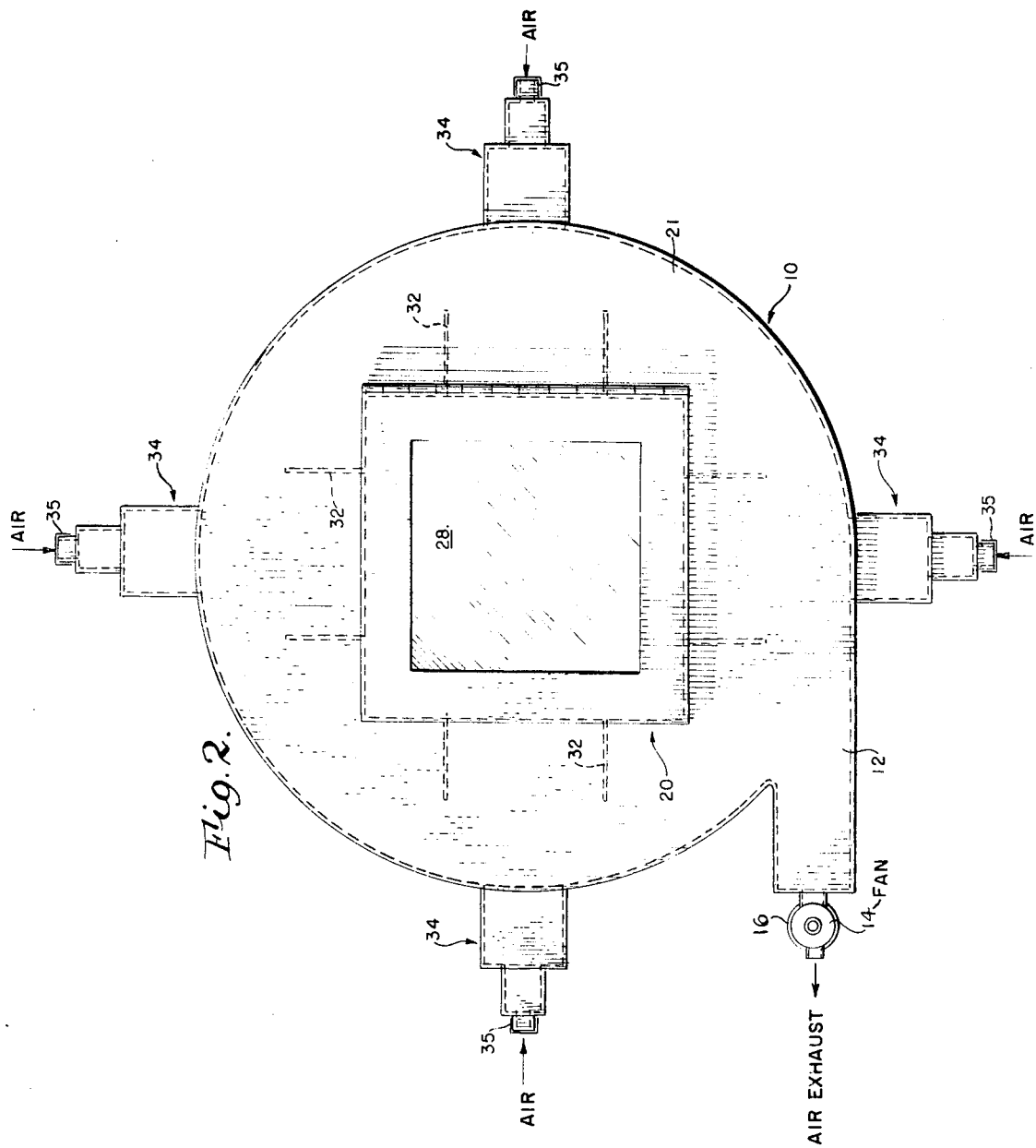
INVENTOR.
GEORGE C. WEBB
BY
Bean & Bean
ATTORNEYS

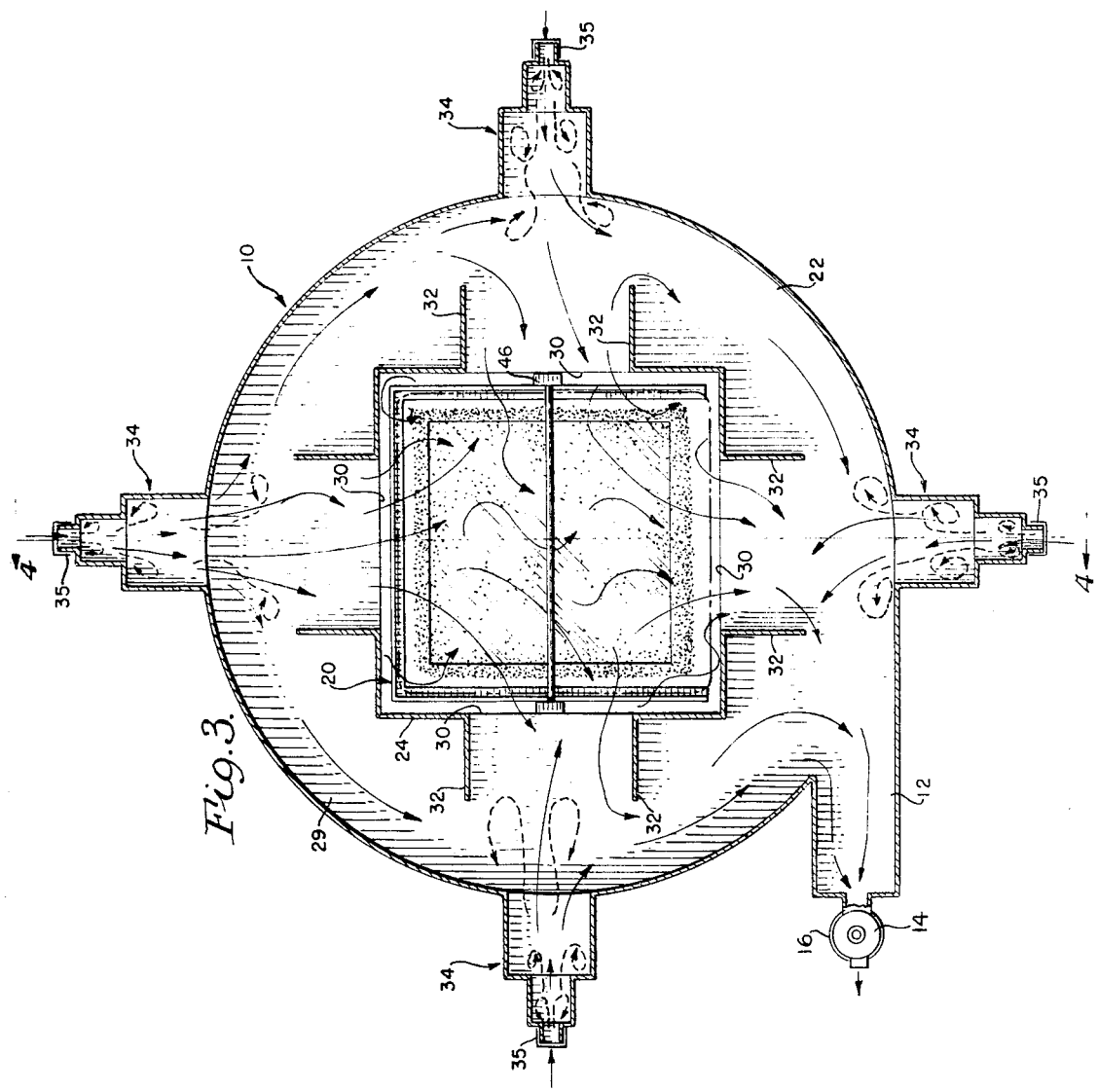

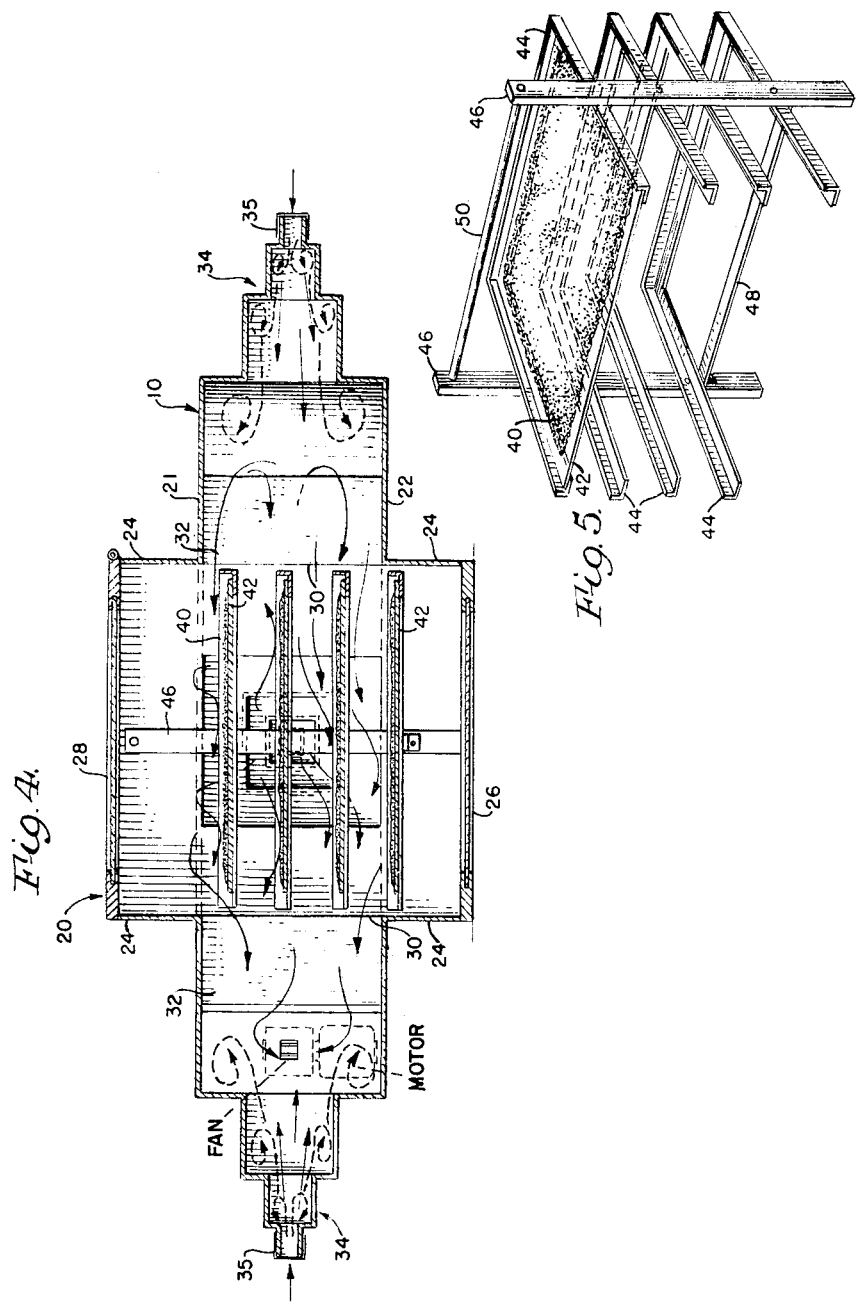

United States Patent Office 3,511,297
Patented May 12, 1970

3,511,297
APPARATUS FOR DEHYDRATION OF ORGANIC
LIQUIDS-SOLIDS COMPOSITES
George C. Webb, 711 Parker Blvd.,
Buffalo, N.Y. 14223
Filed June 5, 1968, Ser. No. 734,698
Int. Cl. B01d 1/14; F26b 21/00
U.S. Cl. 159—5                                     8 Claims

ABSTRACT OF THE DISCLOSURE

A combination dehydrator and purifier for organic liquids-solids composites, featuring means providing an improved "idle" flow pattern of treatment air (or gas) travel over the material being treated.

Background of the invention

This invention relates to the art of dehydrating; and more particularly to an apparatus for processing certain organic liquids-solids composites when it is required to preserve the solids contents thereof against damage or deterioration effects such as are encountered when heating or freezing processes are employed. The process and apparatus of the present invention facilitates and renders feasible the interim storage or other handling of such materials prior to subsequent reconstitution by addition of water, or other subsequent processing in preparation for its intended end use. The invention is useful in connection with the processing of organic, biological, biochemical products or materials; such as for example serums, human blood, plasma, albumins, pharmaceuticals, and the like. Whereas my prior U.S.A. Pat. No. 2,911,-732 discloses an apparatus eminently qualified to dehydrate edible comestibles or the like; the present invention deals with a distinctly different problem and provides an apparatus which is successful in solving a long-pressing need for a practicable apparatus and method in respect to purification as well as preservation of a totally different class of materials, as set forth hereinabove.

Brief summary of the invention

The invention provides an improved process for the above stated purposes by providing an improved "idle" or gentle and constant flow of drying air (or gas) over the material in process, in such manner that the volatile essential substance vapors of the material in process flow around and through the solid substances thereof. Thus, the solids constituents substantially reabsorb the essential constituents of the volatiles; accompanied by a gradual bleeding-off of substantially only the water vapor contents of the material to the discharge.

Also, the invention operates in accordance with a discovery that in a germicidally infected material the infectant substance possess a stronger affinity for the water content of the material, and that the solid constituents and the essential volatile constituents of organic and biologic substances and the like possess stronger inherent affinities for each other than for the water contents thereof, when volatilized. Thus, the invention provides a combination purification and dehydration process designed specifically to provide a product from which the natural water content as well as any infectant have been abstracted; while retaining substantially all of the essential constituents in the original structural and textural forms thereof. Hence, when the material is reconstituted by subsequent addition of water, or is otherwise processed, it not only is purified but is also in all essential respects to an improved degree in its original components and natural content form. The invention employs no heating or freezing steps such as would otherwise deleteriously affect the material in process.

Heretofore dehydration processes in the various industries have been typically directed toward rapid freeze-dry, and/or heat-accelerated or fast-flow drying air evaporation methods; and such methods employ relatively large volume air blasts and freezing or heat applications and/or emphasize the rapid removal of moisture-bearing air away from the material being processed. Although such prior art methods are today in wide use and are relatively cheap and provide quick drying results and are satisfactory for some purposes, in the field of the present invention the results so obtained are not acceptable because freezing or heating of the essential substances invariably alters the structures of the solids or tissues or other components thereof, and such processes of the prior art invariably involved substantial loss of the essential volatile constituents of the material along with the water content thereof. For example, the process and apparatus as set forth in my earlier U.S.A. Pat. 2,911,732 is applicable only to certain materials as set forth therein, while the present invention solves a problem which relates to the processing of an entirely different class of materials.

It is a primary object of the present invention to provide an improved apparatus for dehydrating substances or materials as aforesaid, to such degree as is sufficient to give the product a satisfactory storage or "shelf-life" prior to its reconstitutioning and end use.

Another object of the invention is to provide an improved machine as aforesaid which also operates to purify certain substances, and which involves minimal loss of the essential ingredients of the composite; whereby upon its reconstitutioning it provides a purified and "restored" material, having respect to its structure, texture, and desired performance characteristics.

Another object of the invention is to provide an improved method for purification and preservation and reconstitutioning of certain materials as explained hereinabove.

Still another object of the invention is to provide a dehydrator apparatus as aforesaid which is economical to operate, and which is easily loaded and unloaded and readily accessible for cleaning or maintenance servicing, or the like.

Further objects and advantages of the invention will appear from the following specification and the accompanying drawing wherein:

Brief description of the drawing figures

FIG. 2 is a top plan view thereof;

FIG. 3 is a sectional view taken on the line 3—3 of FIG. 1;

FIG. 4 is a sectional view taken on the line 4—4 of FIG. 3; and

FIG. 5 is a perspective view showing details of the material support tray system.

Detailed description of the invention

Figure 1:
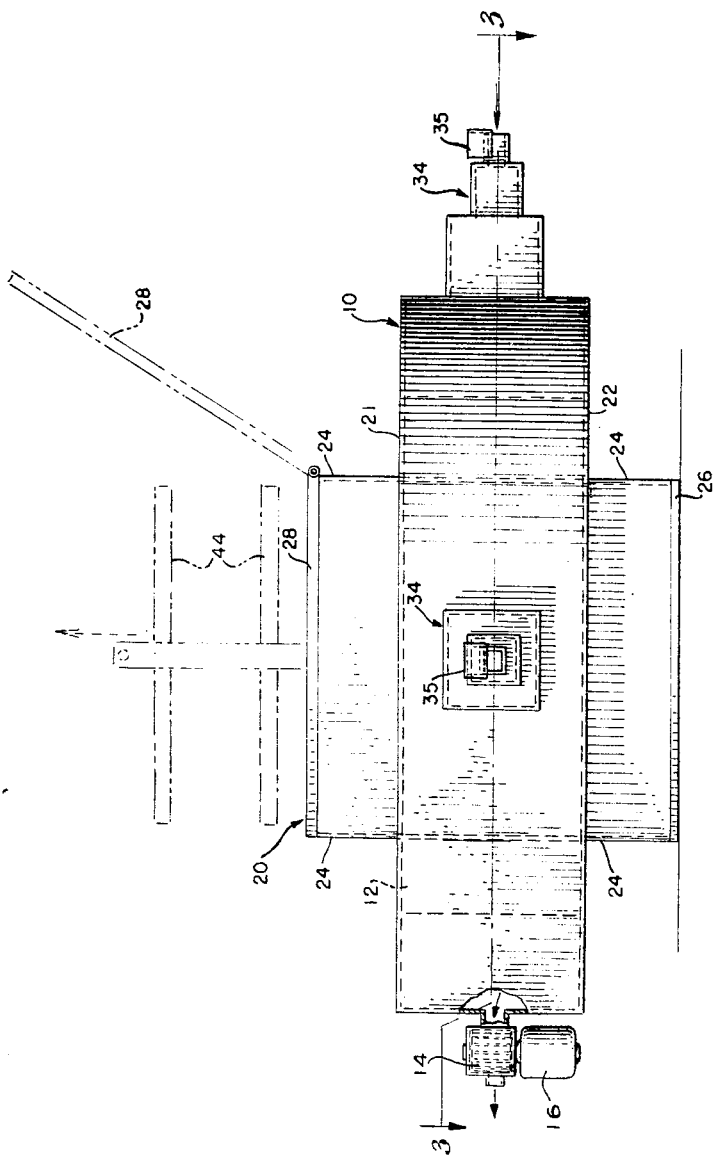
FIG. 1 is a side elevational view of an apparatus of the invention.

As illustrated herein, the apparatus of the invention comprises generally a horizontally disposed cylindrical casing 10 having a tangential air duct 12 in communication with a rotary exhaust fan 14 driven by a motor 16; the casing being disposed so that its cylindrical axis extends vertically. As shown in the drawing herewith, the fan 14 is relatively minute, and is so operated as to only very slowly exhaust air from the casing 10. The housing 10 encircles a vertically extending material processing chamber as indicated generally at 20, which intersects the top and bottom plates 21, 22, respectively, of the casing 10. The chamber 20 comprises a rectangular shaped well extending vertically through the center of the casing 10, is defined by side wall plates as indicated at 24 and is closed at the bottom by a floor plate 26 and at the top by means of a hinged cover 28.

Inside the casing 10 the side wall plates 24 are apertured as indicated at 30 (FIGS. 3, 4) throughout the height of the casing 10, and the apertures or "windows" 30 are framed by vertical baffle plates 32 standing at opposite sides of each window 30 and extending from the side plates 24 into the circular passageway 29 as best shown at FIG. 3, for purposes to be explained hereinafter. The casing 10 is provided with air inlets 34 at geometrically spaced intervals around the outside wall thereof, which are equipped with air flow control valve devices as indicated at 35. The inlets 34 are of progressively larger "stacked box" or cubical forms so that as air enters each inlet through its valve 35, it is given a three-dimensional swirling motion before and as it enters the main chamber 10 as indicated by the broken line directional flow arrows of FIGS. 3, 4. The duct 12 is square-ended and apertured thereat to communicate with a small-sectioned inlet to the fan 14. Therefore, as the fan 14 idly draws air through duct 12 its operation assists in maintaining the uniform swirling air pattern inside the chamber. The air displaced to discharge by the fan 14 is replaced by air drawn into the chamber as described hereinabove which thereupon moves "idly" in a random pattern back and forth through the central "well" portion of the device; and appropriate manual adjustments of the valves 35 will obtain the desired flow pattern throughout the interior of the machine.

As best shown at FIGS. 4, 5, the material to be processed such as is indicated at 40, is thinly spread upon a series of pans or trays 42 which are slidably mounted upon support rails 44 which are in turn horizontally disposed in vertically spaced relation within a carrying rack comprising a pair of vertical posts 46, 46; a bottom spreader 48; and an upper carrying handle bar 50. The support rails 44 are so positioned in the rack as to dispose the trays 42 at vertically spaced levels within the reaches of the "windows" 30 through the side walls of the well device 20; whereby when the loaded rack is lowered into the well as shown at FIG. 4 and the coverplate 28 is closed, the machine will operate to provide the improved dehydration effects as explained hereinabove. Thus it will be understood that loading and unloading of the machine with the material in process may be performed with utmost ease and facility.

As mentioned hereinabove, in the case of apparatuses of the prior art, including my earlier U.S.A. Pat. 2,911,732, whereas the mechanisms thereof provided for relatively rapid flow of conditioning air over the materials in process the present invention contemplates only a gentle or "idle" aeration of the material in process. This is accomplished by utilization of a low net volume displacement exhaust fan system as shown herein, in combination with the novel cyclone flow path arrangement of the apparatus, as distinguished from the cyclone path arrangement of my earlier patent aforesaid. In the case of the present invention the major air flow through the machine follows the cylindrical wall of the casing and thereby circumscribes the relatively small area of the well 20 wherein the process material resides. However, the baffles 32, projecting into the major flow path causes the air supply to be pulled randomly and gently back and forth across the process material, thereby creating a net flow through the well and from all sides thereof at only a fractional rate compared to the rate of air displacement through the discharge fan. Therefore, it is a particular feature of the apparatus of the present invention that by means of the mechanism hereinabove described, a random "idle" form of air flow pattern at precisely controlled rates through the inlets 34 and back and forth across the process material, whereby an improved form of dehydration effect on the material in process results, in accordance with the objects of the present invention.

Laboratory tests confirming efficacy of the invention (1) An independent laboratory electrophoretically analyzed albumin and globulin samples, before and after dehydration (and subsequent reconstitution) in an apparatus of the present invention. Parallel electrophoretic patterns were graphed by laboratory technicians, which established that the samples lost no values during dehydration and reconstitution.

(2) An independent bio-chemical laboratory analyzed a serum sample of known infectious hepatitis before and after dehydration (and subsequent reconstitution) in an apparatus of the present invention, and reported as follows:

| | Before | After | Normal Range |
|---|---|---|---|
| Total Bilirubin | 2.6 | 2.4 | 0.2–1.0 |
| Acid Phosyhatase | 1.2 | 0.35 | 0.03–0.7 |
| Alkaline Phosphatase | 4.6 | 2.35 | 0.8–2.9 |
| Lactic Dehydrogenase | 610 | 380 | 200–450 |
| Serum GOTransaminase | 100 | 50 | 8–40 |
| Serum GPTransaminase | 62 | 27 | 5–30 |

It will be noted that the pathological values for hepatic disease, as reflected in the Enzyme Elevations, were completely normalized upon dehydration and reconstitution.

The Bilirubin is of course not enzyme and merely reflects the degree of red cell destruction as excreted by the liver. That this color reaction was almost fully retained even after dehydration and reconstitution is proof that the basic constituents of the original serum remained undisturbed.

The return of the enzyme values to the normal range would suggest, however, that perhaps the infectious agent of hepatitis had to some appreciable extent been curbed.

It is currently recognized that pooled human blood plazma readily transmits hepatitis and recommendations against continued use of whole, pooled plasma are predicated upon this recognition. With the use of the present invention, this danger in pooled plasma may be avoided and the substantial benefits deriving from the pooling of whole plasma may be obtained without the danger of spreading infectious diseases.

(3) Approximately 6 ml. of whole blood was obtained from and by venipuncture from a patient afflicted with chronic myelogenous leukemia. The hematological values for this specimen were established by three medical technologists and their average numerical value finding recorded.

The specimen was then dehydrated in an apparatus of the present invention. After 1½ hours the blood, now powder-dry, was reconstituted with HOH. The reconstituted sample was then subjected to identical hematological determinations by the same three medical technologists. Below are the values before and after tests:

| | Before grams | After grams |
|---|---|---|
| Hemoglobin | 7.0 | 6.95 |
| Hematocrit | 24 | 23 |
| White blood count | 172,000 | 168,000 |
| Red Blood count | 3,010,000 | 2,960,000 |
| Myeloblasts | 9 | 10 |
| Promyelocytes | 6 | 5 |
| Myelocytes | 19 | 20 |
| Metanyelocytes | 38 | 38 |
| Bands | 5 | 4 |
| Basoyhils | 3 | 3 |
| Monocytes | 20 | 20 |

CONCLUSION.—Extraordinary approximation of hematological values of fresh blood without hemolysis.

(4) A sample of serum globulin (gamma portion) was used as the suspension agent for a 1:10 dilution of known rabies positive skunk brain tissue. After incubating the suspension for 1½ hours in a 37.5 water bath, and then removing to an ice bath, .03 ml. of this suspension was injected intracranially into each of 5 21-days old Swiss mice, to determine strength of the virus in vivo. Nine days after injection, these mice exhibited signs of rabies ataxia, paralysis of the hind quarters and aversion to water. When the condition of these mice became terminal they were sacrificed and their brains examined by Fluorescent Antibody Technique. These films exhibited classic inclusions of the rabies virus under the fluorescent microscope.

Concurrently, .03 ml. rabies infected gamma globulin dehydrated in accordance with the invention and then reconstituted with distilled water, was injected intracanially into a second group of 5 mice, under the same conditions as the first group. Thirty-five days following the injection all of the mice of this second group were alive and well, showing none of the typical symptoms of rabies.

I claim:

1. A dehydrator apparatus including:
a closed hollow circular casing having a circular side wall extending vertically, and closed at its top and bottom portions,
air inlet means in open communication with the interior of said casing through said circular side wall,
a well structure disposed centrally within said casing,
air exhaust means having its air intake directed tangentially of said circular wall to induce a major air flow pattern inside of said circular wall circulating around said well structure,
and hanger means carrying a plurality of process-material-supporting shelves in vertically spaced relation adapted to fit inside said well structure,
said well structure being "windowed" interiorly of said casing in air flow alignment with the open spaces between said shelves from all sides thereof,
whereby upon operation of said exhaust means air is drawn through said inlet means to create said major circular air flow pattern while increments thereof diverge slowly in a rambling pattern, crossing and recrossing said shelves at a flow rate much less than the flow rate induced by said air exhaust means eventually to pass out of said well structure and again into said major flow pattern and then to discharge.

2. The dehydrator apparatus according to claim 1 wherein said air inlet means includes an adjustable air flow control mechanism.

3. The dehydrator apparatus according to claim 1 wherein said air inlet means comprises a plurality of air inlet ports spaced circumferentially around said side wall and each of said ports being provided with a selectively adjustable air flow control mechanism.

4. The dehydrator apparatus according to claim 3 including baffle means extending from said well structure into said major air flow pattern.

5. The dehydrator apparatus according to claim 1 including baffle means extending from said well structure into said major air flow pattern.

6. The dehydrator apparatus according to claim 1 wherein said casing is closed at its top by a flat plate having a central opening in vertical registry with said well structure, said well structure extending vertically between the top and bottom of said casing, and closure means for said central opening.

7. The dehydrator apparatus according to claim 6 wherein said air inlet means comprises a plurality of air inlet ports spaced circumferentially around said side wall and each of said ports being provided with a selectively adjustable air flow control mechanism.

8. The dehydrator apparatus according to claim 7 including baffle means extending from said well structure into said major air flow pattern.

References Cited

UNITED STATES PATENTS

| | | | |
|---|---|---|---|
| 285,987 | 10/1883 | Belcher et al. | 34—193 |
| 1,291,891 | 1/1919 | Horst | 34—231 X |
| 1,507,719 | 9/1924 | Ritchie | 34—193 |
| 1,961,143 | 6/1934 | Gehnrick | 34—221 X |
| 2,911,732 | 11/1959 | Webb | 34—193 |

FOREIGN PATENTS

| | | | |
|---|---|---|---|
| 22,821 | 1/1906 | Austria. | |

NORMAN YUDKOFF, Primary Examiner

J. SOFER, Assistant Examiner

U.S. Cl. X.R.

34—195; 159—16.